(12) United States Patent
Hibino et al.

(10) Patent No.: US 6,631,879 B2
(45) Date of Patent: Oct. 14, 2003

(54) SEAT APPARATUS VEHICLE

(75) Inventors: Keiichi Hibino, Kariya (JP); Yukifumi Yamada, Toyota (JP)

(73) Assignee: Algin Seiki Kabushiki Kaisha, Kariya (JP)

( * ) Notice: Subject to any disclaimer, the term of this patent is extended or adjusted under 35 U.S.C. 154(b) by 48 days.

(21) Appl. No.: 09/939,760

(22) Filed: Aug. 28, 2001

(65) Prior Publication Data

US 2002/0043605 A1 Apr. 18, 2002

(30) Foreign Application Priority Data

Aug. 28, 2000 (JP) ........................................ 2000-256618

(51) Int. Cl.$^7$ .............................................. F16M 13/00
(52) U.S. Cl. ...................................... 248/429; 248/424
(58) Field of Search ...................... 297/336; 296/65.03, 296/65.13; 248/424, 429

(56) References Cited

U.S. PATENT DOCUMENTS

| | | | | |
|---|---|---|---|---|
| 6,036,252 A | * | 3/2000 | Hecksel et al. | 296/65.03 |
| 6,161,892 A | * | 12/2000 | Chabanne et al. | 296/65.03 |
| 6,250,704 B1 | * | 6/2001 | Garrido | 296/65.05 |
| 6,345,856 B1 | * | 2/2002 | Minai | 296/65.03 |

FOREIGN PATENT DOCUMENTS

JP        2000-177460 A        6/2000

* cited by examiner

*Primary Examiner*—Kimberly Wood
(74) *Attorney, Agent, or Firm*—Burns, Doane, Swecker & Mathis, LLP

(57) ABSTRACT

A seat apparatus for a vehicle includes a seat portion having a seat cushion, a seat slide mechanism for adjusting the position of the seat portion back and forth, and a lock mechanism adapted to effect locking engagement of the seat portion with a striker fixedly arranged relative to the floor of the vehicle, with the locking engagement being adapted to be released at a predetermined fixed position of the seat portion. A first operational mechanism is provided for operating the lock mechanism and is adapted to be operated from the rear side of the seat portion, and a second operational mechanism is provided for adjusting the position of the seat portion and is adapted to be operated from the front side and the rear side of the seat portion.

20 Claims, 4 Drawing Sheets

SEAT APPARATUS VEHICLE

This application is based on and claims priority under 35 U.S.C. §119 with respect to Japanese Patent Application No.2000-256618 filed on Aug. 28, 2000, the entire content of which is incorporated herein by reference.

FIELD OF THE INVENTION

The present invention generally relates to a seat apparatus for a vehicle. More particularly, the present invention pertains to a vehicle seat apparatus having a locking mechanism for effecting engagement with the vehicle floor.

BACKGROUND OF THE INVENTION

An example of a known seat apparatus for a vehicle is disclosed in Japanese Unexamined Patent Publication No. 2000-177460. This disclosed seat apparatus has a locking mechanism for effecting engagement of the seat apparatus with the floor of the vehicle, and a seat slide apparatus which adjusts the seat position back and forth within a predetermined range relative to the vehicle floor. The locking mechanism can be released only when the seat position is located at a predetermined position.

In this seat apparatus, an operation handle for adjusting the seat position is located at the front side of the seat apparatus. Therefore, when an operator is in front of the seat apparatus, the operator is able to operate the operation handle. However, when the operator is behind the seat apparatus, the operator cannot operate the operation handle.

In the above seat apparatus, when the operator wants to remove the seat apparatus from the floor for enlarging the rear room space of the vehicle to permit the loading of relatively large cargo, the operator must first go to the front side of the seat apparatus to adjust the seat slide apparatus to the predetermined position. Then the operator goes behind the seat apparatus to release the locking mechanism for removing the seat apparatus. This is somewhat troublesome for the operator because the operator must move from the front side of the seat apparatus to the rear side of the seat apparatus.

It would thus be desirable to provided a seat apparatus which is not as susceptible to the aforementioned drawbacks.

It would be desirable to provide a seat apparatus in which the operator could operate the seat slide apparatus, even when the operator is positioned behind the seat apparatus.

SUMMARY OF THE INVENTION

According to one aspect of the invention, a seat apparatus for a vehicle includes a seat portion having a seat cushion, a seat slide mechanism for adjusting the position of the seat portion back and forth, and a lock mechanism adapted to effect locking engagement of the seat portion with a striker fixedly arranged relative to the floor of the vehicle, with the locking engagement being adapted to be released at a predetermined fixed position of the seat portion. A first operational mechanism is provided for operating the lock mechanism and is adapted to be operated from the rear side of the seat portion, and a second operational mechanism is provided for adjusting the position of the seat portion and is adapted to be operated from the front side and the rear side of the seat portion.

According to another aspect of the invention, a seat apparatus for a vehicle includes an upper rail slidably supported on a lower rail, a seat portion secured to the upper rail, an engaging plate rotatably supported on the upper rail and including a plurality of engaging portions positioned in holes in the lower rail to fix the upper rail relative to the lower rail and adapted to be moved out of the holes to permit back and forth sliding movement of the upper rail relative to the lower rail, a front handle located at a front side of the seat portion and operatively connected to the engaging plate to rotate the engaging plate and move the engaging portions out of the holes to permit sliding movement of the upper rail relative to the lower rail, and a rear handle located at a rear side of the seat portion and operatively connected to the engaging plate to rotate the engaging plate and move the engaging portions out of the holes to permit sliding movement of the upper rail relative to the lower rail. A lock mechanism is adapted to effect locking engagement of the seat portion with a striker secured to the vehicle, and a lock handle is located at the rear side of the vehicle and is adapted to operatively engage the lock mechanism to release the locking engagement.

In accordance with another aspect of the invention, a seat apparatus for a vehicle includes a seat portion, a seat slide mechanism to which is secured the seat portion for adjusting a position of the seat portion in a back and forth manner between a forward most position and a rearward most position, a lock mechanism adapted to effect locking engagement of the seat portion with a striker secured to the vehicle, a front handle positioned at a front side of the seat portion and operatively connected to the seat slide mechanism to release the seat slide mechanism and permit back and forth adjustment of the seat portion, a rear handle positioned at a rear side of the seat portion and operatively connected to the seat slide mechanism to release the seat slide mechanism and permit back and forth adjustment of the seat portion, and a lock handle positioned at the rear side of the seat portion and adapted to operatively engage the lock mechanism to release the locking engagement only when the seat portion has been moved to a predetermined position.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
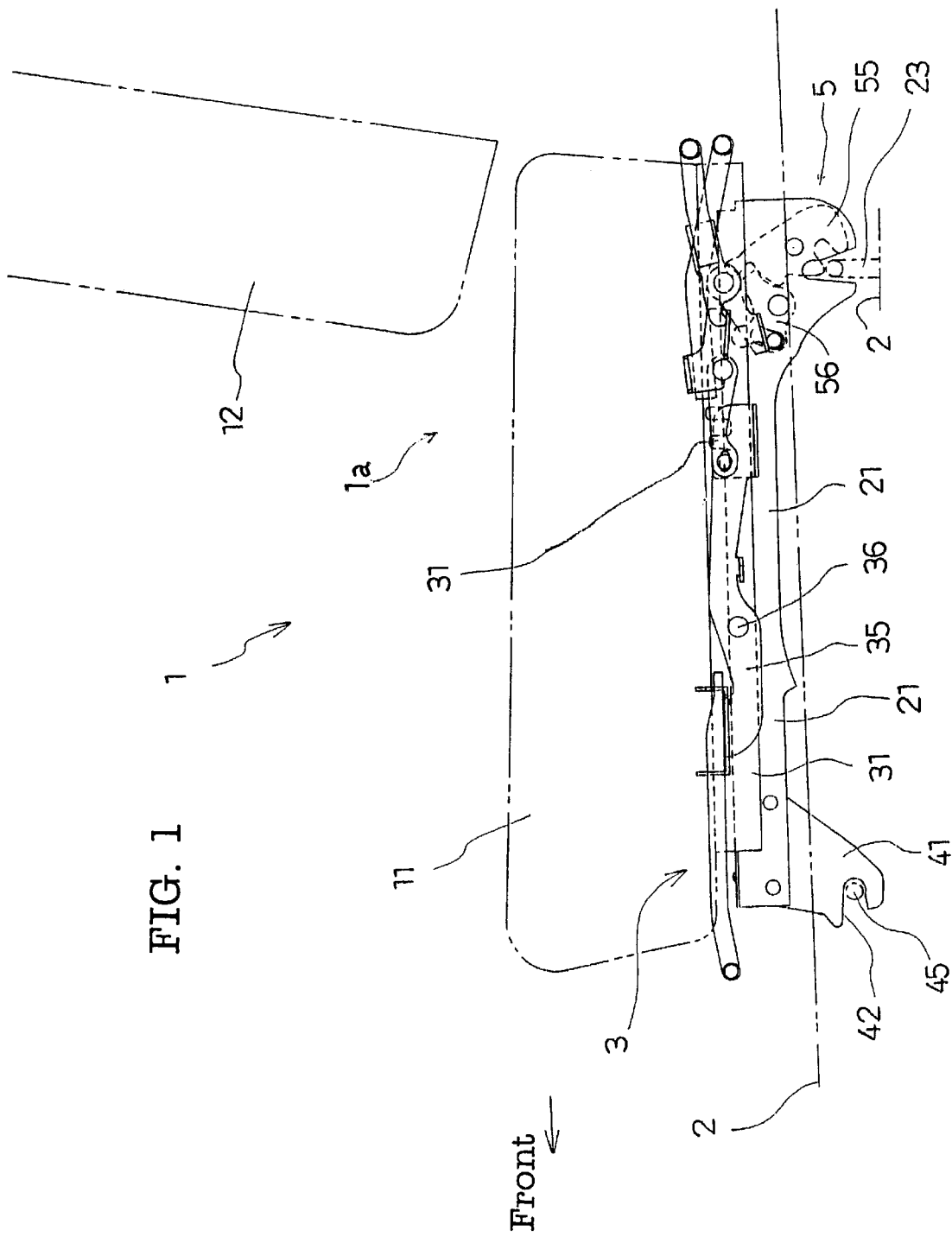
FIG. 1 is a side elevation view of a seat apparatus in accordance with the present invention.

Referring initially to FIG. 1, the seat apparatus 1 for a vehicle in accordance with the present invention includes a seat portion 1a having a seat cushion 11 and a seat back 12. The seat apparatus 1 also includes a seat slide device comprised of a slide mechanism 3 located on each side of the seat apparatus 1 for allowing the position of the seat portion 1a to be adjusted in the back and forth direction.

Each of the slide mechanisms 3 has an upper rail 31 and a lower rail 21. The upper rail 31 is attached to the under side of the seat cushion 11 while the lower rail 21 is disposed on the vehicle floor 2. The upper rail 31 and the lower rail 21 forming each slide mechanism 3 extend in the front and the rear direction of the vehicle and are slidably engaged with each other. An axial pin 36 is fixed on the inner surface of the upper rail 31 so as to rotatably support an engaging plate 35.

Figure 2:
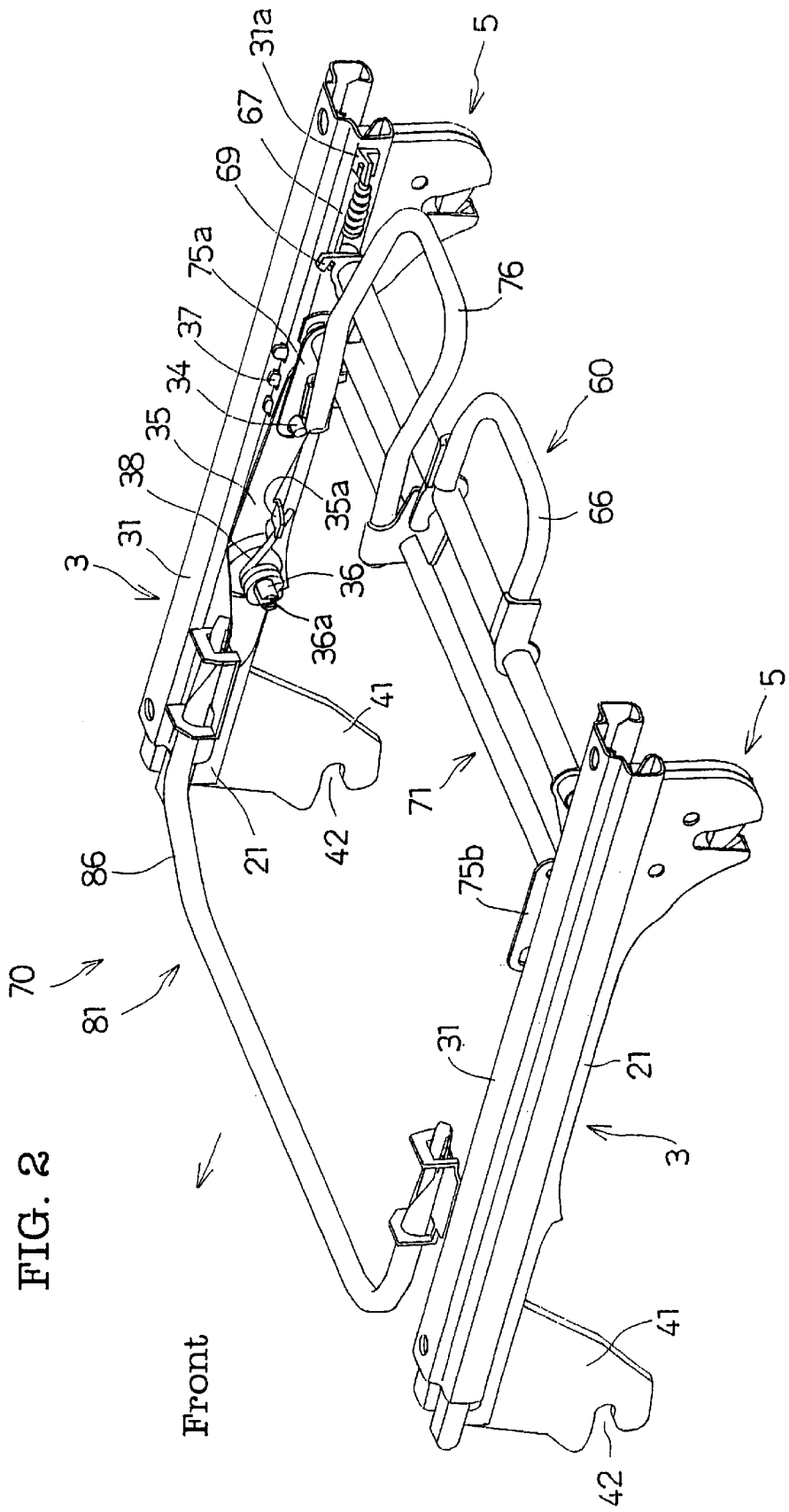
FIG. 2 is a perspective view of a portion of the seat apparatus shown in FIG. 1.
Figure 3:
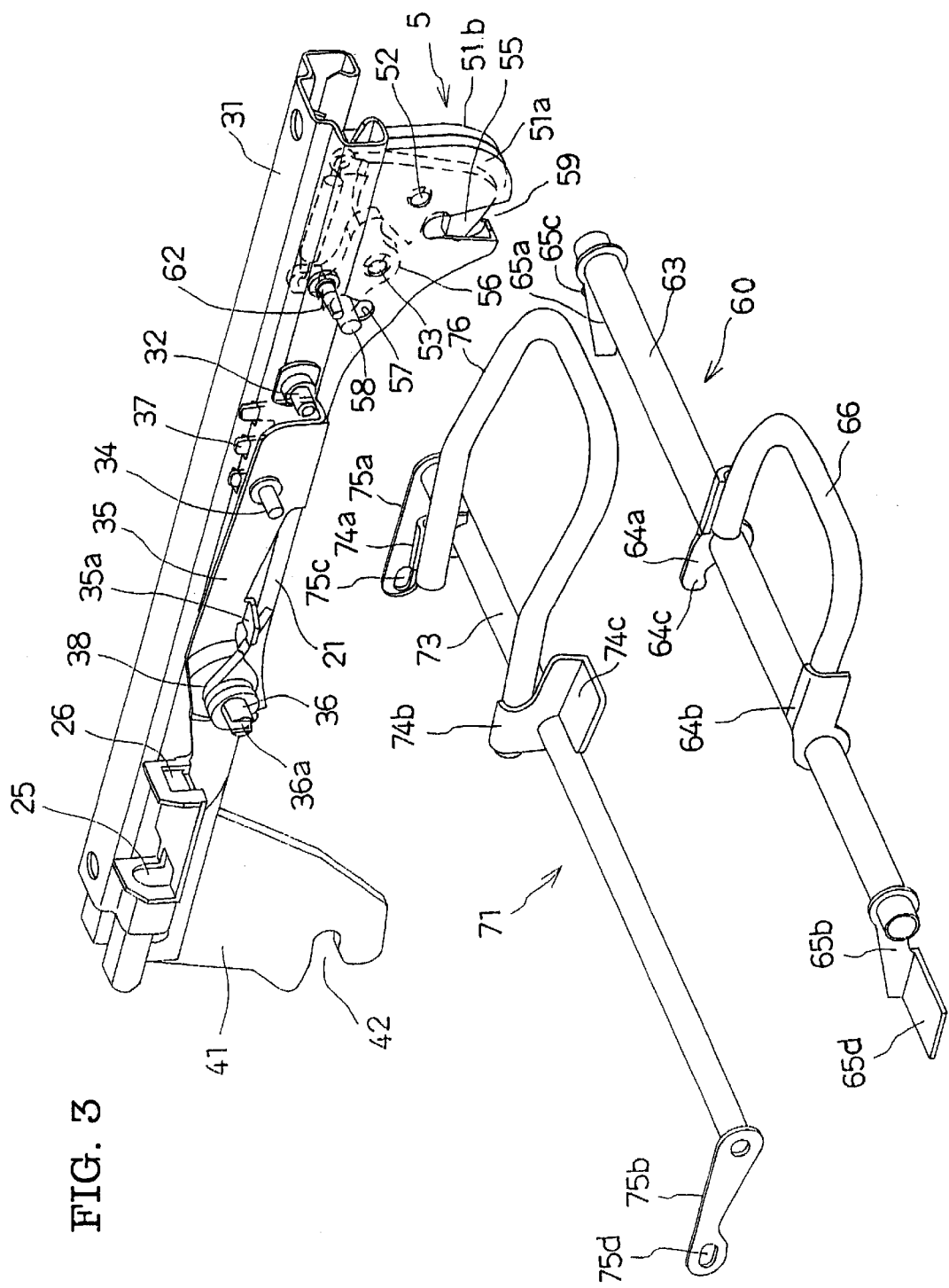
FIG. 3 is an exploded perspective view of a portion of the seat apparatus shown in FIG. 1.
Figure 4:
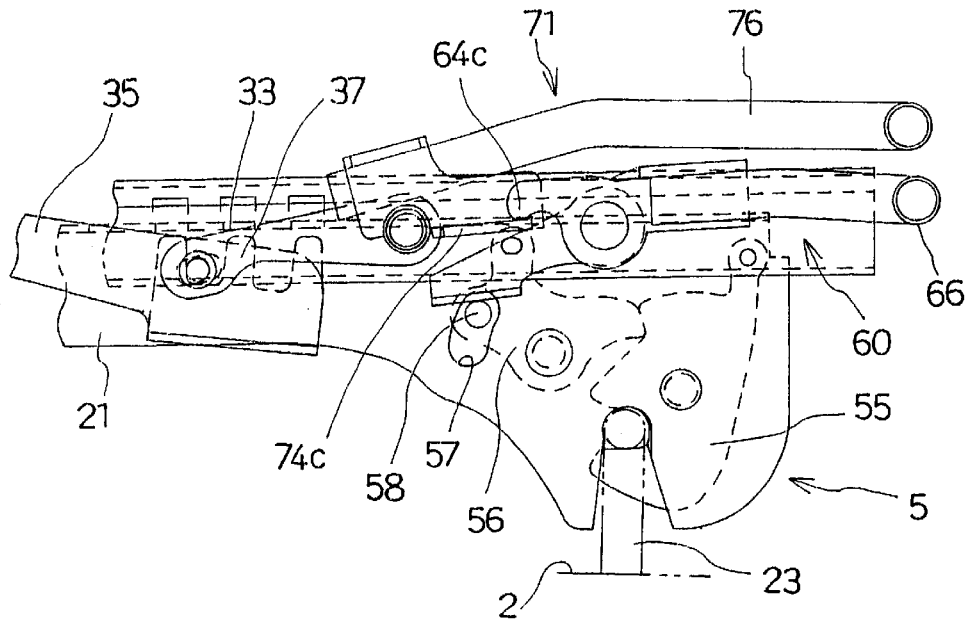
FIG. 4 is a side elevation view of the locking mechanism used in the seat apparatus shown in FIG. 1.

As shown in FIGS. 2–5, the rear end portion of the engaging plate 35 is provided with a plurality of upwardly extending engaging portions 37. In the illustrated embodiment, three engaging portion 37 are provided on the rear end portion of the engaging plate 35. The engaging portions 37 are adapted to be inserted in or pulled out from respective connecting holes 33 which are formed on the lower rail 21 as shown in FIG. 4. When the engaging portions 37 are inserted or positioned in the respective connecting holes 33, the upper rail 31 and the lower rail 21 are fixed relative to one another to prevent relative sliding movement, whereas when the engaging portions 37 are pulled out from the respective connecting holes 33, the upper rail 31 and the lower rail 21 are released and relative movement of the upper rail 31 with respect to the lower rail 21 is permitted.

As shown in FIG. 2, a torsion spring 38 is located between the engaging plate 35 and the axial pin 36. One end of the torsion spring 38 is inserted in a groove 36a at the top of the axial pin 36 while the other end of the torsion spring 38 is supported on a projection 35a of the engaging plate 35. The projection 35a can be formed as an integral part of the engaging plate 35 by bending a portion of the plate at an angle of 90 degrees so that the bent portion extend generally in the horizontal direction. The torsion spring 38 urges the engaging plate 35 in the counter clockwise direction in FIG. 2. It is to be understood that although the details of the seat slide mechanism 3 on only one side are shown in FIG. 2, a similar seat slide mechanism 3 symmetrical with respect to the center of the seat apparatus 1 is provided on the other side.

As shown in FIGS. 1–3, a front slide lever 81 is provided at the front end of the seat apparatus. The front slide lever 81 has a front handle 86 configured in a U-shaped form which can be formed from a hollow rod. As shown in FIG. 3, the engaging plate 35 is provided with several holes 25, 26 formed in upstanding flanges at the front end portion of the engaging plate 35. The holes 25, 26 are aligned and are arranged along the lengthwise direction of the upper rail 31. Each of the ends of the front handle 86 is inserted into the holes 25, 26 and is fixed with the engaging plate 35 by a spring member (not shown). The front handle 86 is arranged to extend horizontally with respect to the front side and to be operable from the front side of the seat apparatus 1. When the front portion of the front handle 86 is lifted up, the engaging plate 35 is rotated in the clockwise direction in FIG. 2 around the axial pin 36 against the urging force of the torsion spring 38, thus releasing the engagement between the engaging members 37 and the connecting holes 33 and allowing the upper rail 31 to slide relative to the lower rail 21.

As shown in FIG. 3, a pin 34 which extends in the horizontal direction toward the center of the seat apparatus 1 is located on the rear end portion of the engaging plate 35. A lever pin 32 extends from the inner surface of the upper rail 31. The lever pin 32 is located rearwardly of the pin 34 and also extends in the horizontal direction toward the center of the seat apparatus 1. A rear slide lever mechanism 71 which includes a hollow rod 73 is disposed between the seat slide mechanisms 3. The lever pins 32 engage the rod 73 by virtue of the lever pins 32 being positioned in the ends of the hollow rod 73.

A pair of arms plates 75a, 75b are fixed to the hollow rod 73 and extend toward the front direction, with each arm plate being fixed to one of the ends of the hollow rod 73. The front end of the arm plate 75a is provided with a horizontally extending hole 75c that receives the pin 34 and the other arm plate 75b is also provided with a horizontally extending hole 75d that receives the pin 34 on the other side of the seat apparatus. A rear handle 76 which can also be made of a hollow rod possess a U-shaped form and is connected to the hollow rod 73 via a pair of brackets 74a, 74b. The rear handle 76 extends horizontally toward the rear direction. Further, the brackets 74b has a contacting portion 74c which extends in the horizontal direction toward the rear side of the seat apparatus 1.

With this construction, even when the operator is situated behind the seat apparatus 1, the operator can lift up the rear handle 76 and rotate the rear slide lever mechanism 71 around the lever pin 32. Thus, the operator can release the engagement of the engaging members 37 with the connection holes 33 from the rear of the seat apparatus. Also, with this construction, by operating a slide operation mechanism 70 (second operational mechanism) including the rear slide lever mechanism 71 and the front slide lever 81, the operator can operate the seat slide mechanisms 3 from the both front and rear side of the seat apparatus 1.

As shown in FIGS. 2 and 3, anchor brackets 41 are fixed on the front ends of the lower rails 21 and extend downwardly. A mouth portion or groove 42 is located at the lower end portion of each anchor bracket 41 and opens toward the front side of the seat apparatus 1. Each of the mouth portions 42 engages an anchor pin 45 as shown in FIG. 1, when a driver or a passenger sits on the seat apparatus 1. The anchor pin 45 extends horizontally in the width-wise direction of the vehicle and is fixed on the floor 2.

A lock mechanism 5 is located on the lower rear end of each lower rail 21. At the rear end portion of the lower rail 21, a pair of downwardly extending plates are integrally formed with the lower rail 21 and form housings 51a, 51b of the lock mechanisms 5. Both of the housings 51a, 51b have mouth portions or grooves 59 which open downwardly at the lower ends of the housings 51a, 51b. A latch pin 52 and a pawl pin 53 are horizontally fixed between the housings 51a and 51b. A latch 55 is rotatably arranged around the latch pin 52, and a pawl 56 is rotatably arranged around the pawl pin 53. The locking or unlocking engagement of the housings 51a, 51b with a striker 23 is controlled by the rotation of the latch 55. The striker 23 is fixed on the vehicle floor 2 as shown in FIG. 1.

The pawl 56 is adapted to engage or disengage the latch 55. When the pawl 56 engages the latch 55, the pawl 56 prevents the latch 55 from rotating. A release pin 58 is fixed to the side surface of the pawl 56. The release pin 58 extends in the horizontal direction toward the center of the seat apparatus 1 and is positioned in an elongated hole 57 formed on the housing 51a of the lock mechanism 5. A lock lever pin 62 is fixed on the inner surface of the upper rail 31 at a position rearwardly of the lever pin 32 and extends in the horizontal direction toward the center of the seat apparatus 1.

A lock operation mechanism 60 (first operational mechanism) is engaged with the lock lever pin 62 to control, the lock mechanism 5. The lock operation mechanism 60 includes a hollow rod 63, a pair of brackets 64a, 64b and a lock handle 66. The length of the hollow rod 63 is substantially the same as the distance between the slide mechanisms 3, 3. The hollow rod 63 engages the lever pins 62 by virtue of the lever pins 62 being positioned or inserted in the end portions of the hollow rod 63. The lock handle 66 can be in the form of a hollow rod and possesses a U-shaped configuration. The lock handle 66 is fixed at the center portion of the hollow rod 63 via the brackets 64a, 64b. The lock handle 66 extends horizontally toward the rear side of the seat apparatus 1.

The bracket 64a has an arm portion 64c extending toward the front side of the seat apparatus 1. The arm portion 64c is disposed over the contacting portion 74c of the rear slide mechanism 71. A release plate 65a, 65b is fixed to each end of the hollow rod 63. Each of the release plates 65a, 65b has a connecting portion 65c, 65d which extends under the upper rail 31. When the upper rail 31 is adjusted to the rearmost portion relative to the lower rail 21, the connecting portions 65c, 65d are arranged to be able to contact the release pins 58 upon lifting the lock handle 66. That is, with the upper rail 31 adjusted to the rearmost portion relative to the lower rail 21, the connecting portions 65c, 65d are arranged just above the release pins 58. A hook portion 69 is provided on the upper portion of the release plate 65a as shown in FIG. 2. A spring 67 is disposed between the hook portion 69 on the release plate 65a and a hook portion 31a provided on the upper rail 31 to rotate the lock operation mechanism 60 in the clockwise direction in FIG. 2.

Having described the structure of the seat apparatus, set forth below is a discussion of the operation of the seat apparatus. When an operator (e.g., a driver, passenger or other individual) sitting on the seat portion 1a wants to adjust the forward/rearward position of the seat apparatus 1 to obtain an adequate driving posture or position, the operator lifts up the front handle 86 to adjust the position of the seat portion.

On the other hand, when the operator wants to remove the seat apparatus 1, the following operation steps are performed. First, the operator lifts up the rear slide handle 76 to release the seat slide mechanism 3. Then, the operator adjusts the seat position to the rearmost portion. The operator leaves hold of or releases the rear slide handle 76 and then lifts up the locking handle 66 to release the locking mechanism 5. With the locking mechanism released, the operator lifts up the seat apparatus 1 around the anchor pin 45 to release the anchor bracket 41 from the anchor pin 45. The seat apparatus 1 can thus be removed.

Figure 5:
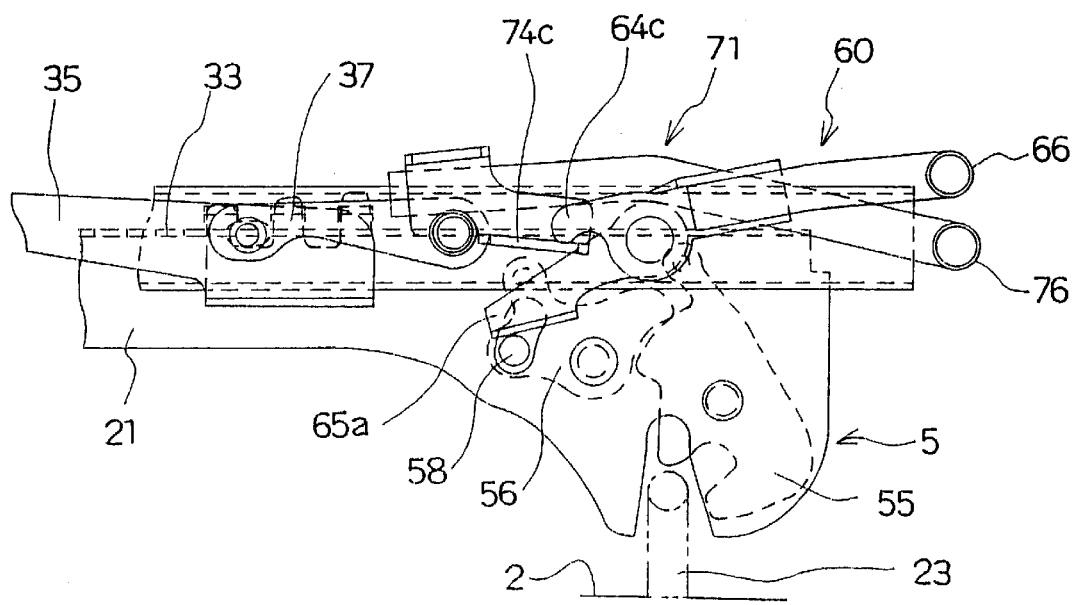
FIG. 5 is a side elevation view of the locking mechanism shown in FIG. 4.

During the process of removing the seat apparatus 1, if the operator tries to lift up the lock handle 66 while the rear handle 76 is lifted up, the contacting portion 74c of the rear slide lever mechanism 71 contacts the arm portion 64c and prevents the lock handle 66 from being lifted up as shown in FIG. 4, thus preventing the seat lock release operation. Also, as shown in FIG. 5, when the operator tries to lift up the rear handle 76 of the rear slide lever mechanism 71 while the lock handle 66 is lifted up, the contacting portion 74c contacts the arm portion 64c and prevents the rear handle 76 from being lifted up, thus preventing the slide release operation. The contacting portion 74c and the arm portion 64c thus form a cancel or preventing mechanism that cancels or prevents the release operation of the seat slide mechanism when the first operational mechanism 60 is operated and cancels or prevents the release operation of the lock mechanism when the second operational mechanism 70 is operated.

In this seat apparatus structure, the operator cannot release the seat slide mechanism 3 and the lock mechanism 5 at the same time. Therefore, when the operator seeks to remove the seat apparatus, the seat apparatus 1 is prevented from unexpected sliding operation. In addition, according to this invention, the operator can relatively easily attach or remove the seat apparatus 1 from a position behind the seat apparatus.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat apparatus for a vehicle comprising:
    an upper rail slidably supported on a lower rail;
    a seat portion secured to the upper rail;
    an engaging plate rotatably supported on the upper rail and including a plurality of engaging portions positioned in holes in the lower rail to fix the upper rail relative to the lower rail and adapted to be moved out of the holes to permit back and forth sliding movement of the upper rail relative to the lower rail;
    a front handle located at a front side of the seat portion and operatively connected to the engaging plate to rotate the engaging plate and move the engaging portions out of the holes to permit sliding movement of the upper rail relative to the lower rail;
    a rear handle located at a rear side of the seat portion and operatively connected to the engaging plate to rotate the engaging plate and move the engaging portions out of the holes to permit sliding movement of the upper rail relative to the lower rail;
    a lock mechanism adapted to effect locking engagement of the seat portion with a striker; and
    a lock handle located at the rear side of the vehicle and adapted to operatively engage the lock mechanism to release the locking engagement.

2. The seat apparatus for a vehicle according to claim 1, wherein the rear handle is connected to a first rod and the lock handle is connected to a second rod, and including an arm portion extending from the second rod and a contacting portion extending from the first rod, the arm portion and the contacting portion being adapted to engage one another when lifting of the lock handle is attempted at a time when the rear handle is lifted to prevent release of the locking engagement while the engaging portions of the engaging plate are moved out of the holes.

3. The seat apparatus for a vehicle according to claim 1, wherein the rear handle is connected to a first rod and the lock handle is connected to a second rod, and including an arm portion extending from the second rod and a contacting portion extending from the first rod, the arm portion and the contacting portion being adapted to engage one another when lifting of the rear handle is attempted at a time when the lock handle is lifted to prevent the engaging portions of the engaging plate from being moved out of the holes in the lower rail while the locking engagement is released.

4. The seat apparatus for a vehicle according to claim 1, wherein the lock mechanism includes a rotatable latch adapted to engage the striker and a pawl which is engageable with the latch to prevent the latch from rotating, the pawl being provided with a release pin, the lock handle being connected to a rod, and a release plate extending from the rod for engaging the release pin when the lock handle is rotated to move the pawl out of engagement with the latch and permit the latch to rotate.

5. The seat apparatus for a vehicle according to claim 4, including a spring which applies a biasing force to the rod and the lock handle.

6. The seat apparatus for a vehicle according to claim 1, including an anchor bracket fixed to each lower rail at the front side of the seat portion, each anchor bracket including a mouth portion opening in a forward direction for receiving an anchor pin fixed to a floor of the vehicle.

7. A seat apparatus in a vehicle comprising:
a seat portion having a seat cushion;
a striker fixedly arranged relative to a floor of the vehicle;
a seat slide mechanism for adjusting a position of the seat portion relative to the vehicle floor;
a lock mechanism for effecting locking engagement of the seat portion with the striker, the lock mechanism releasing the locking engagement at a predetermined fixed position of the seat portion;
a first operation mechanism operable from a rear side of the seat portion for releasing the lock mechanism; and
a second operation mechanism operable from the front side and the rear side of the seat portion for releasing the seat slide mechanism.

8. The seat apparatus in a vehicle according to claim 7, further comprising a cancel mechanism which cancels the release of the seat slide mechanism when the first operational mechanism is operated and cancels the release of the lock mechanism when the second operational mechanism is operated.

9. The seat apparatus in a vehicle according to claim 8, wherein the cancel mechanism includes an interfering mechanism between the first operation mechanism and the second operation mechanism.

10. The seat apparatus in a vehicle according to claim 8, wherein the first operation mechanism includes a first handle connected to a first rod, and the second operation mechanism includes a second handle connected to a second rod for releasing the seat slide mechanism from the front side of the seat portion and a third handle for releasing the seat slide mechanism from the rear side of the seat portion, the cancel mechanism including an arm portion extending from the first rod and a contacting portion extending from the second rod, the arm portion and the contacting portion being adapted to engage one another.

11. The seat apparatus in a vehicle according to claim 7, wherein the seat slide mechanism includes an upper rail slidably supported on a lower rail and an engaging plate rotatably supported on the upper rail, the second operation mechanism including a front handle connected to the engaging plate to rotate the engaging plate upon operation of the front handle and a rear handle connected to the engaging plate to rotate the engaging plate upon operation of the rear handle, the front handle being located at the front side of the seat portion and the rear handle being located at the rear side of the seat portion.

12. The seat apparatus in a vehicle according to claim 11, wherein the lock mechanism includes a rotatable latch adapted to engage the striker and a pawl which is engageable with the latch to prevent the latch from rotating, the pawl being provided with a release pin, the first operation mechanism including a lock handle connected to a rod and a release plate extending from the rod for engaging the release pin when the lock handle is rotated to move the pawl out of engagement with the latch and permit the latch to rotate.

13. The seat apparatus in a vehicle according to claim 7, wherein the lock mechanism includes a rotatable latch adapted to engage the striker and a pawl which is engageable with the latch to prevent the latch from rotating, the pawl being provided with a release pin, the first operation mechanism including a lock handle connected to a rod and a release plate extending from the rod for engaging release pin when the lock handle is rotated to move the pawl out of engagement with the latch and permit the latch to rotate.

14. The seat apparatus in a vehicle according to claim 13, including a spring which applies a biasing force to the rod and the lock handle.

15. A seat apparatus for a vehicle comprising:
a seat portion;
a seat slide mechanism to which is secured the seat portion for adjusting a position of the seat portion in a back and forth manner between a forward most position and a rearward most position;
a lock mechanism adapted to effect locking engagement of the seat portion with a striker;
a front handle positioned at a front side of the seat portion and operatively connected to the seat slide mechanism to release the seat slide mechanism and permit back and forth adjustment of the seat portion;
a rear handle positioned at a rear side of the seat portion and operatively connected to the seat slide mechanism to release the seat slide mechanism and permit back and forth adjustment of the seat portion; and
a lock handle positioned at the rear side of the seat portion and adapted to operatively engage the lock mechanism to release the locking engagement only when the seat portion has been moved to a predetermined position.

16. The seat apparatus for a vehicle according to claim 15, wherein the predetermined position of the seat portion is the rearward most position.

17. The seat apparatus for a vehicle according to claim 15, wherein the rear handle is connected to a first rod and the lock handle is connected to a second rod, and including an arm portion extending from the second rod and a contacting portion extending from the first rod, the arm portion and the contacting portion being adapted to engage one another when lifting of the lock handle is attempted at a time when the rear handle is lifted to prevent release of the locking engagement while the seat slide mechanism is released.

18. The seat apparatus for a vehicle according to claim 15 wherein the rear handle is connected to a first rod and the lock handle is connected to a second rod, and including an arm portion extending from the second rod and a contacting portion extending from the first rod, the arm portion and the contacting portion being adapted to engage one another when lifting of the rear handle is attempted at a time when the lock handle is lifted to prevent release of the seat slide mechanism while the locking engagement is released.

19. The seat apparatus for a vehicle according to claim 15, wherein the lock mechanism includes a rotatable latch adapted to engage the striker and a pawl which is engageable with the latch to prevent the latch from rotating, the pawl being provided with a release pin, the lock handle being connected to a rod, and a release plate extending from the rod for engaging the release pin when the lock handle is rotated to move the pawl out of engagement with the latch and permit the latch to rotate.

20. The seat apparatus for a vehicle according to claim 15, including a spring which applies a biasing force to the lock handle.

* * * * *

UNITED STATES PATENT AND TRADEMARK OFFICE
CERTIFICATE OF CORRECTION

PATENT NO. : 6,631,879 B2
DATED : October 14, 2003
INVENTOR(S) : Keiichi Hibino et al.

It is certified that error appears in the above-identified patent and that said Letters Patent is hereby corrected as shown below:

<u>Title page,</u>
Item [73], Assignee, should read:
-- Aisin Seiki Kabushiki Kaisha, Kariya, Aichi-Ken (JP) --

Signed and Sealed this

Thirtieth Day of March, 2004

JON W. DUDAS
*Acting Director of the United States Patent and Trademark Office*